Feb. 28, 1933.      A. KELLNER      1,899,870

COLLAPSIBLE HOOD FOR VEHICLES

Filed Jan. 13, 1931

Inventor
Alexis Kellner
By
Attorney

Patented Feb. 28, 1933

1,899,870

UNITED STATES PATENT OFFICE

ALEXIS KELLNER, OF BERLIN, GERMANY

COLLAPSIBLE HOOD FOR VEHICLES

Application filed January 13, 1931, Serial No. 508,523, and in Germany January 16, 1930.

This invention relates to a collapsible vehicle hood having longitudinal tilt bars consisting preferably of several parts, especially two. According to this invention, the tilt bar parts are combined with a spring, as well as with a rigid draw rod, one end of which is jointed to the tiltable hood support and the other end of which is jointed to the tilt bar especially to the front member of the same. This arrangement and combination of parts renders it possible to mount large collapsible hoods by far more easily than has hitherto been possible. This possibility constitutes a considerable technical advantage, as the mounting of large collapsible hoods as designed hitherto has been connected with considerable difficulties.

Figure 1:
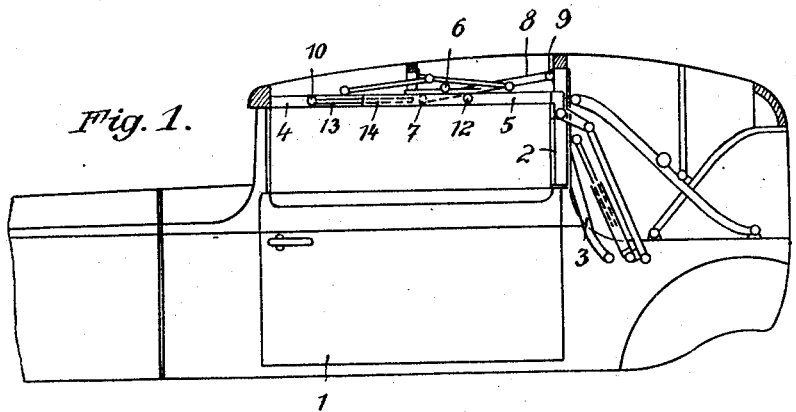
Figure 2:
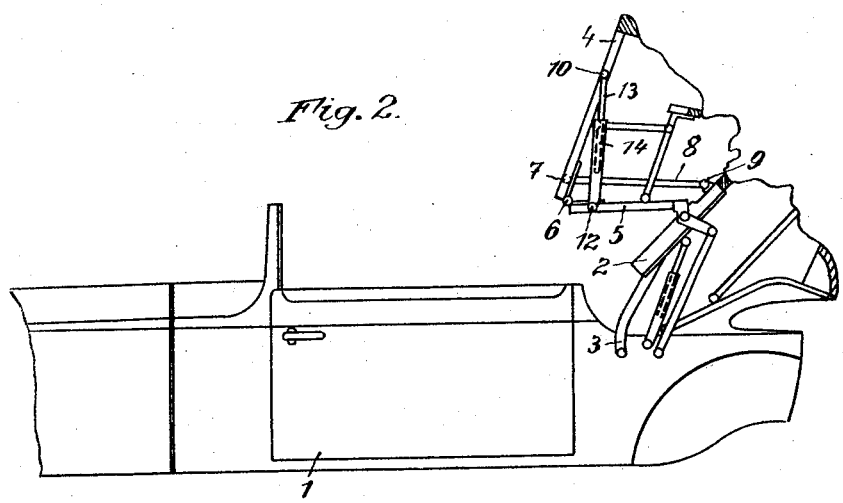
Figure 3:
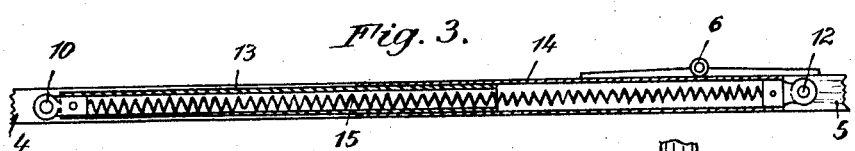
Figure 4:
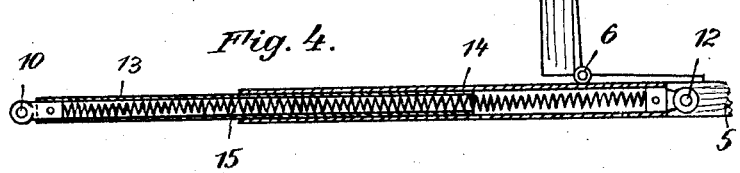

The invention is illustrated diagrammatically and by way of example on the accompanying drawing on which Figure 1 is a side-view of a vehicle body having a hood designed according to this invention, the hood being shown in closed state; Figure 2 is a similar view showing the hood half open; and Figures 3 and 4 show two details in different positions and drawn to an enlarged scale.

On the drawing, 1 denotes the vehicle body, to the rear part of the top of which the tiltable hood supports 2 are hinged in known manner by the intermediary of arms 3. The longitudinal tilt bars, each of which is composed of a front part 4 and of a rear part 5, are hinged to said hood supports 2; more precisely, the parts 5 are hinged to said supports and the parts 4 are hinged to the parts 5; these parts are connected with one another by the hinge 6.

8 denotes a draw rod which is hinged with its front end at the point 7, near the hinge 6, to the part 4 of the respective longitudinal tilt bar; the rear end of the rod 8 is hinged at the point 9 to the tiltable hood support 2. The parts 4 and 5 of the tilt bars are, furthermore, connected with one another by means of telescopic tubes 13 and 14 in which is enclosed a helical compressive spring 15. One end of this spring is, together with the adjacent end of the tube 13, movably connected with the bar 4 by means of a bolt or the like 10, and the other end of the spring 15 is together with the adjacent end of the tube 14, movably connected with the bar 5 by means of a bolt or the like 12. When these members 13, 14 and 15 are in the position shown in Fig. 4, the spring 15 is compressed and tends to turn the bar 4 forwardly, viz. from the position shown in Fig. 2 into that shown in Fig. 1 so as to close the hood. In this position (Figs. 1 and 3) the spring 15 is practically no more under tension. The bars 4 and 5 cannot bend through downwardly into a lower position than that shown in Fig. 1, as such movement is prevented by the draw rod 8.

I wish it to be understood that the rear end of the spring 15 need not indispensably be attached to the bar 5; it may be attached as well to the support 2 or to the rod 8 or to any other suitable member of the hood structure. Furthermore, it is also not indispensably requisite that said spring be arranged laterally from the rods 4 and 5 at the inner sides thereof; it may be located as well at the outer side thereof or above them or below them.

I claim:

1. A collapsible vehicle hood, comprising in combination tiltable hood supports, bipartite longitudinal tilt bars hinged to said supports, a spring element movably connected at one end to the front part of said tilt bars and movably connected at the opposite end to the rear part of said tilt bars, the spring being tensioned in the opening of the hood and serving to assist the closing of the hood, and draw bars wholly independent of the spring element and movably connected to the front part of the tilt bars and to the tiltable hood supports.

2. A collapsible vehicle hood, comprising in combination tiltable hood supports, bipartite longitudinal tilt bars hinged to said supports, a spring element movably connected at one end to the front part of said tilt bars and movably connected at the opposite end to the rear part of said tilt bars, the spring being tensioned in the opening of the hood and serving to assist the closing of the hood, and draw bars wholly independent of the spring element and movably connected to the front part of the tilt bars and to the tiltable hood supports, the forward connection of the draw bars to the front part of the tilt bars being always in advance of the connection of the spring elements to the rear part of the tilt bars.

In testimony whereof I affix my signature.

ALEXIS KELLNER.